(12) United States Patent
Suzuki

(10) Patent No.: US 12,377,977 B2
(45) Date of Patent: Aug. 5, 2025

(54) MANNED AIRCRAFT

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 123 days.

(21) Appl. No.: 17/419,106

(22) PCT Filed: Jan. 1, 2019

(86) PCT No.: PCT/JP2019/000001
§ 371 (c)(1),
(2) Date: Jun. 28, 2021

(87) PCT Pub. No.: WO2020/141567
PCT Pub. Date: Jul. 9, 2020

(65) Prior Publication Data
US 2022/0063800 A1    Mar. 3, 2022

(51) Int. Cl.
*B64C 29/02* (2006.01)
*B64C 27/28* (2006.01)
*B64C 39/02* (2023.01)

(52) U.S. Cl.
CPC ............. *B64C 29/02* (2013.01); *B64C 27/28* (2013.01); *B64C 39/02* (2013.01)

(58) Field of Classification Search
CPC ................................ B64C 29/02; B64C 27/28
See application file for complete search history.

(56) References Cited

U.S. PATENT DOCUMENTS

| | | | |
|---|---|---|---|
| 2,461,347 A | 2/1949 | Pentecost | |
| 2010/0051740 A1* | 3/2010 | Yoeli | B64C 29/0033 244/17.23 |
| 2014/0097290 A1* | 4/2014 | Leng | B60L 50/52 244/6 |
| 2018/0002009 A1 | 1/2018 | McCullough et al. | |
| 2018/0002026 A1 | 1/2018 | Oldroyd et al. | |
| 2020/0317332 A1* | 10/2020 | Didey | B64C 39/08 |

FOREIGN PATENT DOCUMENTS

| | | |
|---|---|---|
| CN | 104443371 A | 3/2015 |
| JP | 2009137559 A | 6/2009 |
| JP | 2013501677 A | 1/2013 |
| JP | 2016517821 A | 6/2016 |
| JP | 2017081360 A | 5/2017 |

(Continued)

OTHER PUBLICATIONS

Notice of reasons for refusal dated Aug. 22, 2019 for related Japanese Patent Application No. 2019-540129.

(Continued)

*Primary Examiner* — Ashesh Dangol
(74) *Attorney, Agent, or Firm* — HAUPTMAN HAM, LLP

(57) ABSTRACT

A manned aircraft that enables an efficient and safe transition from hovering to leveled flight. The aircraft according to the present disclosure includes, a flight part provided with a blade part and a thrust generating part provided on the blade part, an airframe part supporting the flight part, and a boarding part that can be displaced independently from the airframe part Through such configuration, it is possible to transition safely from hovering to leveled flight.

9 Claims, 8 Drawing Sheets

(56) References Cited

FOREIGN PATENT DOCUMENTS

| | | | |
|---|---|---|---|
| KR | 20180128236 | A | 12/2018 |
| KR | 101953892 | B1 | 3/2019 |
| WO | 2014053057 | A1 | 4/2014 |

OTHER PUBLICATIONS

Notification of Reasons for Refusal dated Aug. 18, 2020 for related Japanese Patent Application No. 2019-175460.
European Search Report and Opinion dated Dec. 2, 2021 for related European patent application No. 19907452.7.
Notification of Reasons for Refusal for Japanese Patent Application No. 2019-175460, dated Apr. 20, 2023.
First Notice of Examination Action dated Oct. 28, 2023 for Chinese Application No. 201980078520.5.
Notice of Reasons for Refusal dated Apr. 4, 2024 for Japanese Patent Application No. 2023-100314.

* cited by examiner

[FIG. 1]
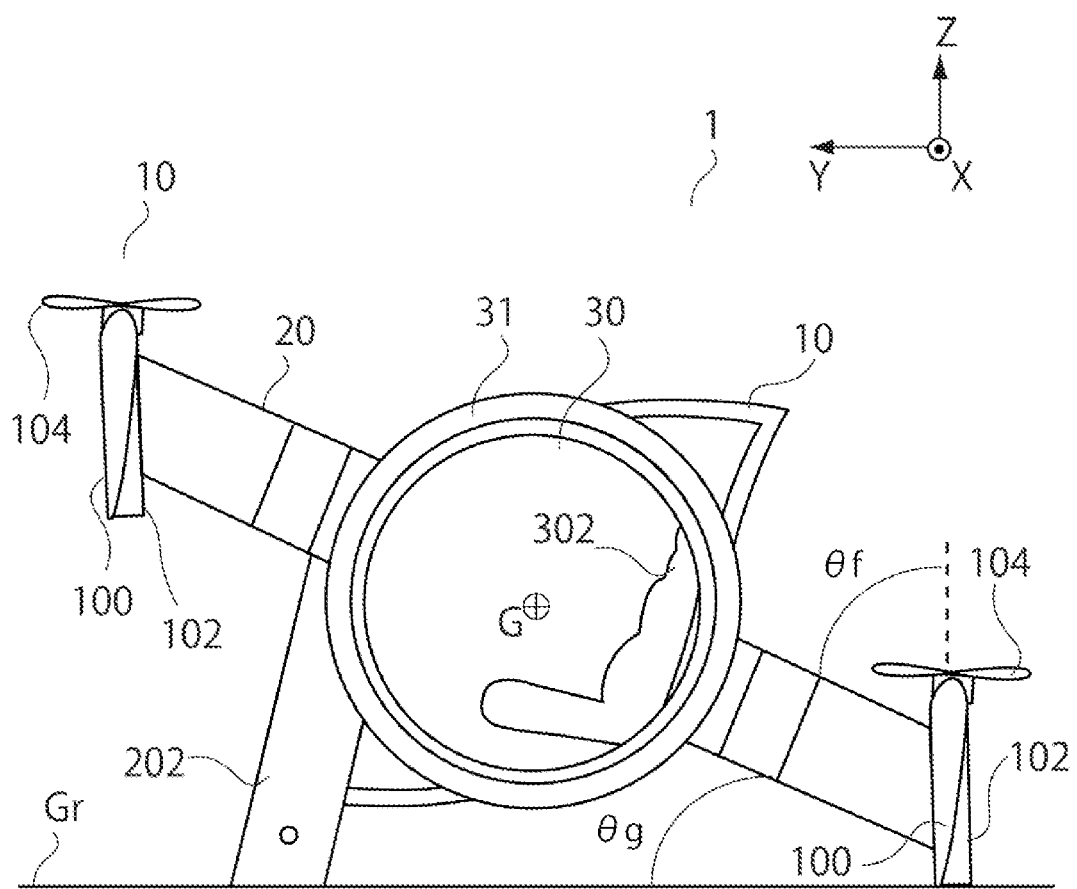

[FIG. 2]
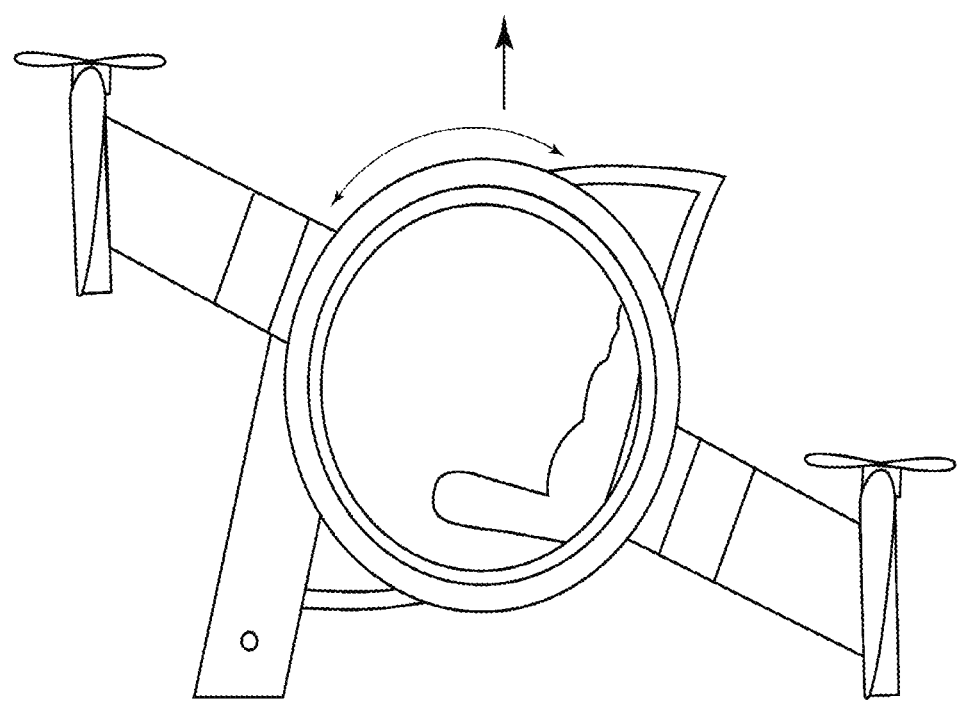
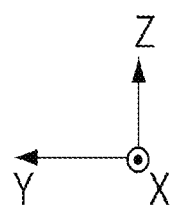

[FIG. 3]
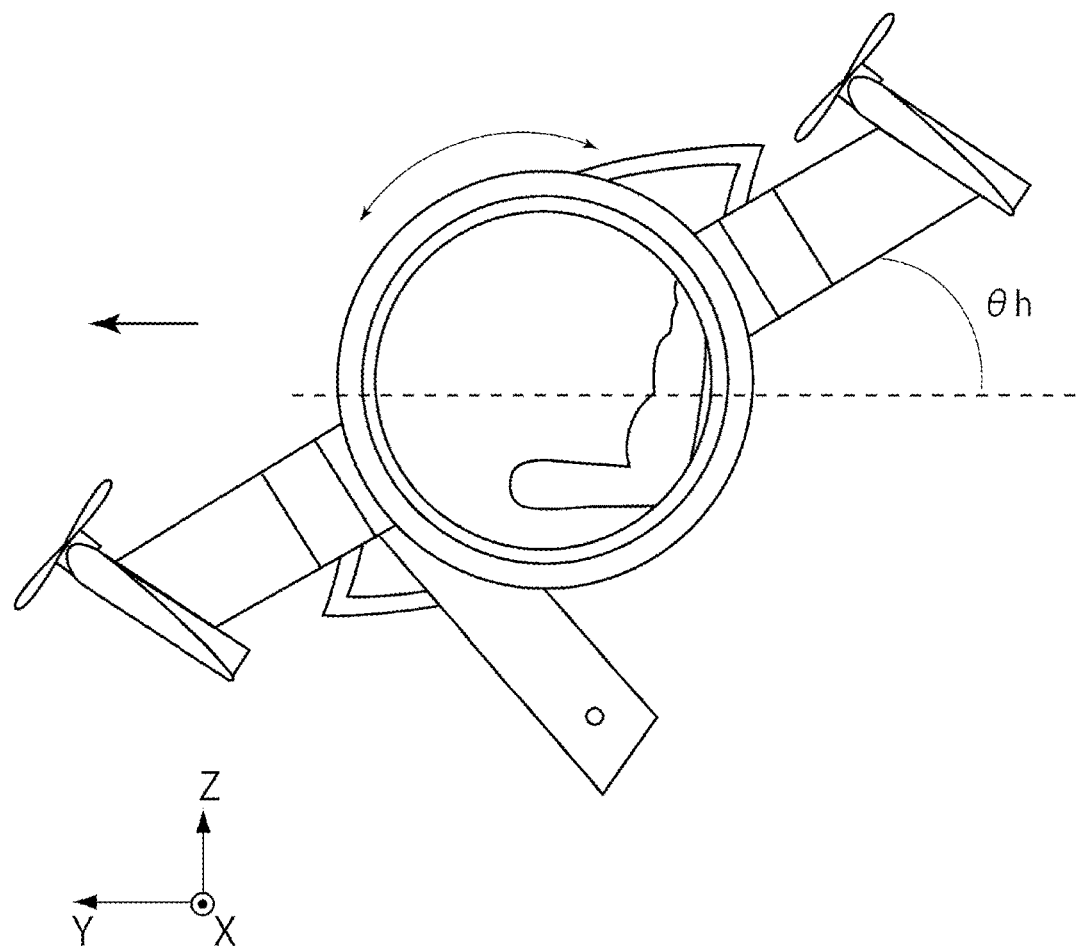

[FIG. 4]
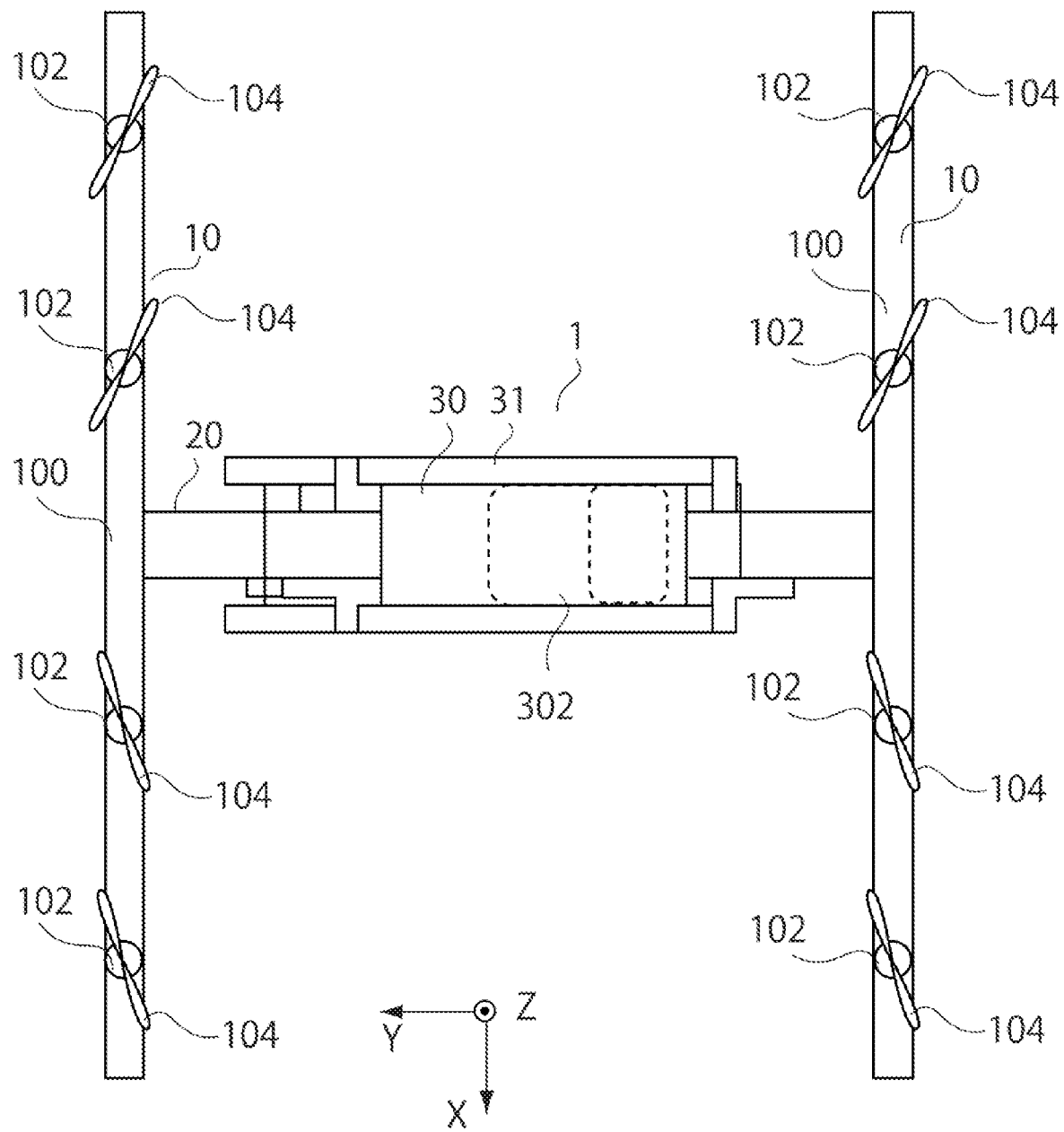

[FIG. 5]
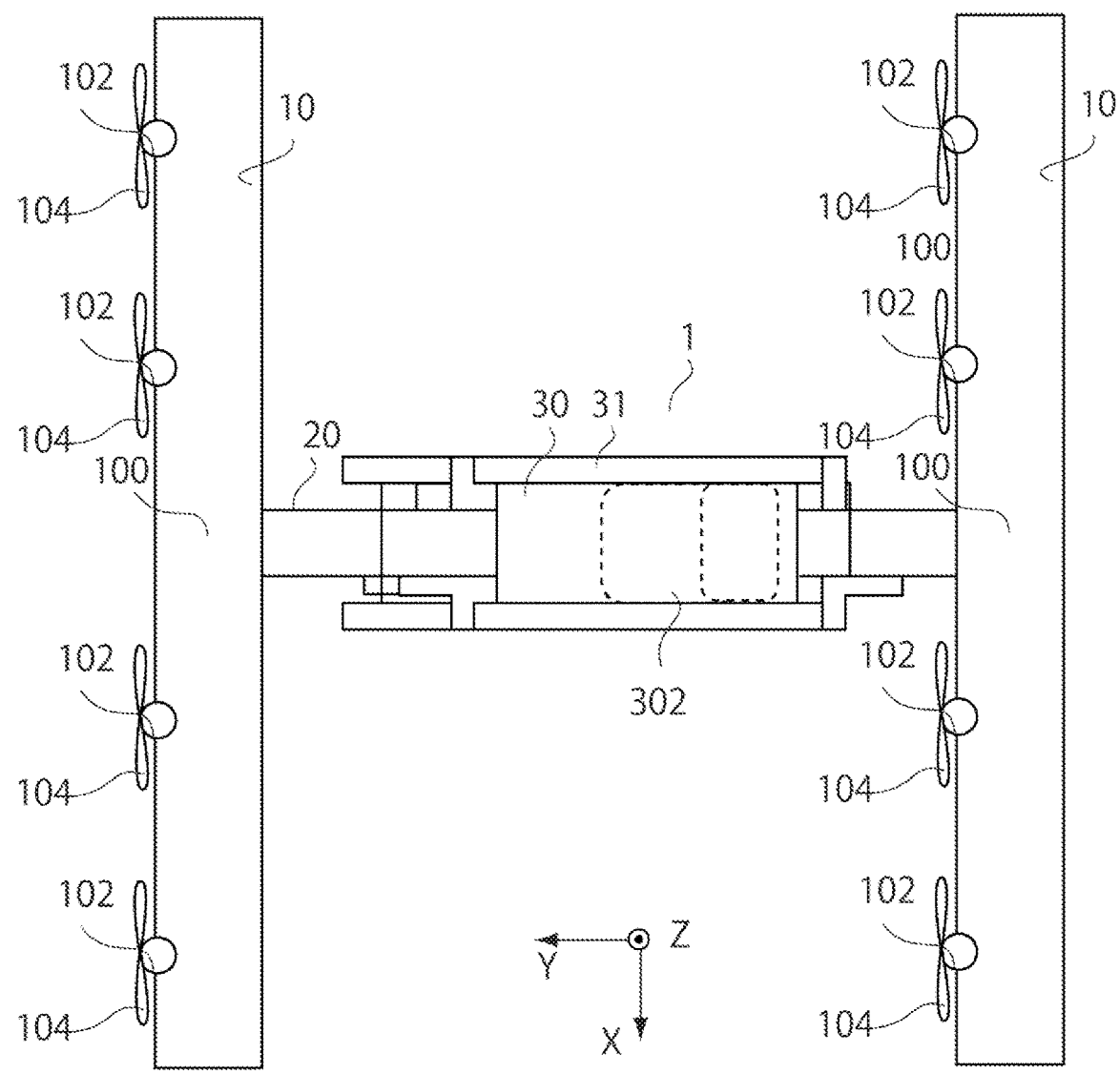

[FIG. 6]
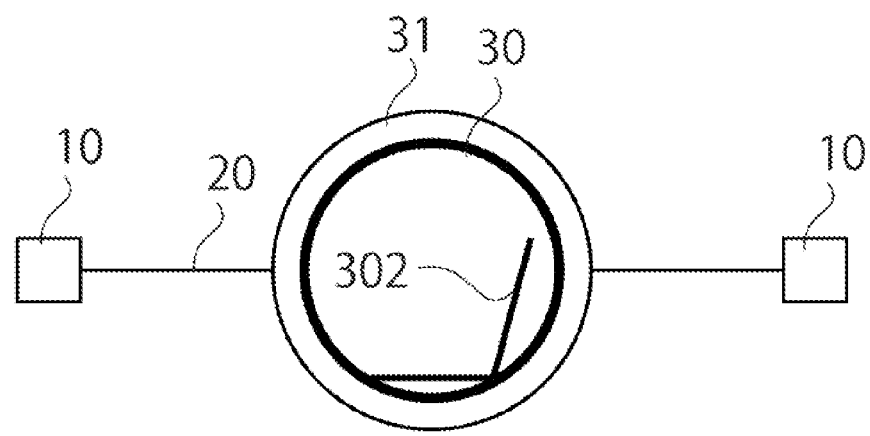

[FIG. 7]
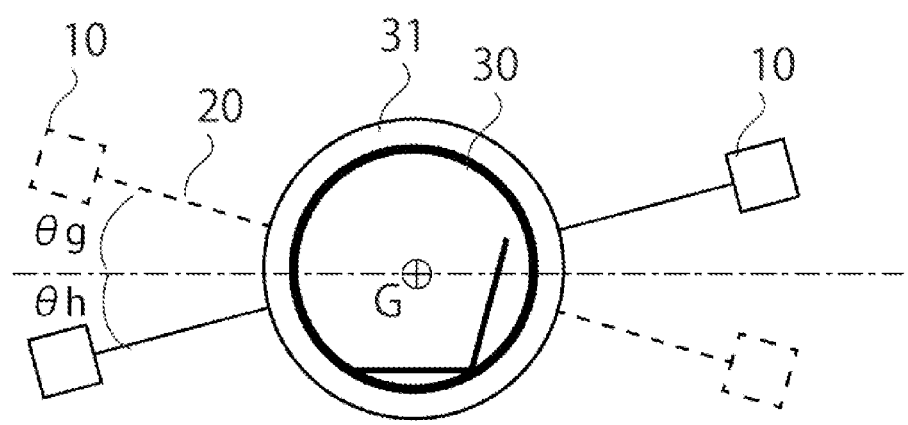
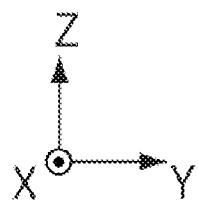

[FIG. 8]
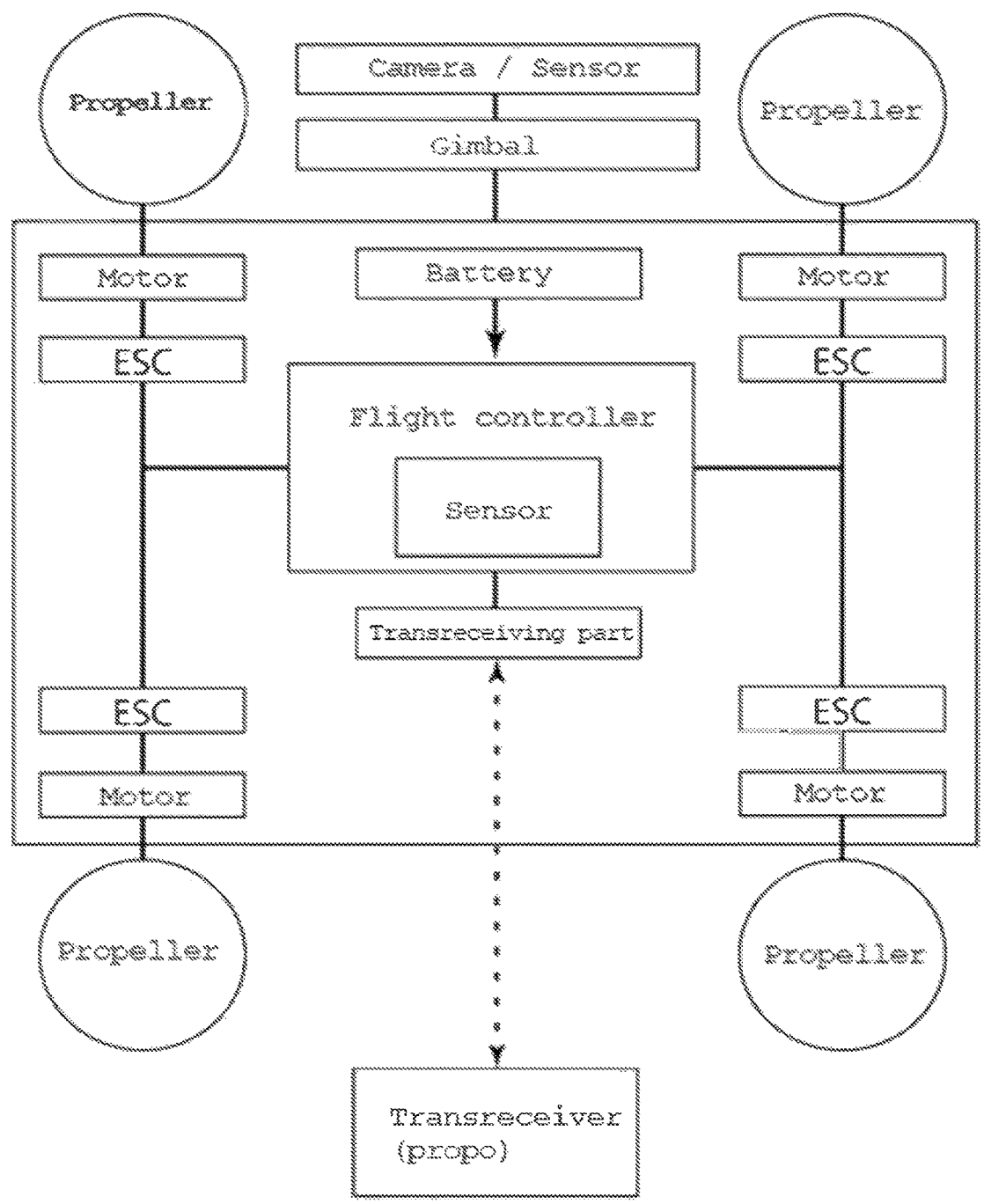

MANNED AIRCRAFT

TECHNICAL FIELD

The present disclosure relates to a manned aircraft, and more particularly to a manned aircraft in which a thrust part and a blade part are displaceably connected.

BACKGROUND ART

As an aircraft having a rotor (rotary wing) and a main wing, two systems, a so-called tilt rotor system and a tilt wing system, are known.

Patent Document 1 discloses an aircraft in which a main wing is fixed to a main airframe part, and an entire rotor including a motor is configured to be displaceable in a range of a vertical direction and a flight direction (tilt rotor system).

On the other hand, Patent Document 2 discloses an aircraft in which a main wing and a main airframe part are configured to be displaceable in a range of a vertical direction and a flight direction (tilt wing system), and a motor and an entire rotor are fixed to the main wing.

PRIOR ART

Patent Literature

Patent Document 1: Japanese Unexamined Patent Application Publication No. 2013-501677
Patent Document 2: Japanese Unexamined Patent Publication No. 2017-81360

SUMMARY OF THE INVENTION

Technical Problem

According to the technology of Patent Document 1, when ascending, the main wing has a low flight efficiency in that the main wing enters a wide area of a propeller slipstream. Further, when transitioning from hovering to leveled flight, the main wing becomes a negative angle of attack (zero lift angle). That is, there is a risk that the airframe will descend until the thrust in the horizontal direction necessary for generating lift by the main wings can be obtained.

According to the technology of Patent Document 2, because the entire wing is displaced, it is unstable when it receives wind resistance.

The present disclosure has been made in view of the above circumstances, and provides a manned aircraft that enables an efficient and safe transition from hovering to leveled flight.

Technical Solution

According to the present disclosure, an aircraft can be provided, the aircraft including,
a lift generating part,
a thrust generating part capable of flying and hovering, and
at least when hovering, a connecting part which displaceably connects the lift generating part and the thrust generating part such that the lift generating part can maintain a positive angle of attack with respect to the flight direction.

Advantageous Effects

According to the present disclosure, it is possible to provide an aircraft that enables an efficient and safe transition from hovering to leveled flight.

BRIEF DESCRIPTION OF THE DRAWINGS

FIG. 1 illustrates a manned aircraft according to an embodiment of the present disclosure. The illustrated aircraft is in a state at the time of landing.
FIG. 2 illustrates a manned aircraft according to an embodiment of the present disclosure. The illustrated aircraft is in a state of ascending.
FIG. 3 illustrates a manned aircraft according to an embodiment of the present disclosure. The illustrated aircraft is in a flying state in the traveling direction.
FIG. 4 is a view of the aircraft of FIG. 2 as viewed from above.
FIG. 5 is a view of the aircraft of FIG. 3 as viewed from above.
FIG. 6 is a conceptual figure of a manned aircraft of the present disclosure.
FIG. 7 is another conceptual figure of a manned aircraft of the present disclosure.
FIG. 8 is a functional block diagram of a manned aircraft of the present disclosure.

DETAILED DESCRIPTION OF THE INVENTION

The disclosure according to the present embodiment has the following configurations.
[Item 1]
  A manned aircraft including,
  a flight part provided with a blade part and a thrust generating part provided on the blade part,
  an airframe part supporting the flight part, and
  a boarding part that can be displaced independently from the airframe part.
[Item 2]
  The manned aircraft as set forth in item 1,
  wherein the boarding part is maintained so as to face in a predetermined direction regardless of the orientation of the airframe part.
[Item 3]
  The manned aircraft as set forth in item 2,
  wherein the thrust generating part is provided in front of a leading edge of the blade part, and
  in a case where the flight part is in a first state that includes ascending, the leading edge of the blade part is directed upwards, while at the same time, the thrust generating part is functioned so as to generate a propulsive force at least in an upward direction, and in a case of a second state including leveled flying, the leading edge of the blade part is directed forward, while at the same time, the thrust generating part is functioned so as to generate a propulsive force at least in a forward direction, configured as such to enable displacement of the states thereof.
[Item 4]
  The manned aircraft as set forth in Item 3,
  further including a lock part which temporarily fixes a positional relationship between the airframe part and the boarding part in at least one of the first state and the second state.

[Item 5]

The manned aircraft as set forth Item 3 or 4,
wherein the blade part has a front blade part and a rear blade part extending in a first direction,
the airframe part extends in a second horizontal direction perpendicular to the first direction, and is connected to the front blade part and the rear blade part,
wherein the boarding part is provided substantially near the center of the airframe part.

[Item 6]

The manned aircraft as set forth in any one of Items 1 to 5,
wherein the airframe has a substantially annular receiving part including the boarding part,
the boarding part has a substantially annular shape corresponding to the shape of the receiving part, and is configured to be independently displaceable in the substantially annular circumferential direction.

[Item 7]

The manned aircraft as set forth in any one of Items 1 to 6,
wherein the center of gravity of the boarding part substantially coincides with the center of gravity of the flight part and the airframe part.

Next, an aircraft according to an embodiment of the present disclosure will be described with reference to the drawings.

<Structure>

As shown in FIG. 1, the manned aircraft 1 according to the present embodiment generally includes a flight part 10, an airframe part 20, and a boarding part 30. The flight part 10 includes a blade part 100, a thrust generating part 102 provided on the blade part 100, and a propeller 104. The airframe part 20 supports the flight part 10. As can be understood by comparing FIGS. 2 and 3, the airframe part 20 (and the flight part 10 fixed to the airframe part 20) and the boarding part 30 are configured to be independently displaceable.

As shown in FIGS. 1 and 4, the manned aircraft 1 according to the present embodiment has an H shape when viewed from above. That is, the manned aircraft 1 includes two flight parts 10 provided in front and behind, and an airframe part 20 (and a boarding part 30) connecting these two flight parts.

As described above, the flight part 10 includes the blade part 100, the motor 102, and the propeller 104. In addition, in the following description, the X-axis, Y-axis, and Z-axis in the drawings correspond to the directions as follows.

X axis: first horizontal direction (+X direction: left, −X direction: right)
Y axis: second horizontal direction (+Y direction: front, −Y direction: rear)
Z axis: vertical direction (+Z direction: up, −Z direction: down)

The blade part 100 extends in the X direction, and is a part where the motor 102 generates lift. In the initial state (the state shown in FIG. 1), the leading edge is upward and the trailing edge is downward. The blade part 100 includes a front blade part 100 and a rear blade part 100.

The thrust generating part generates a forward thrust from the thrust generating part by rotating the propeller (thrust generator) 104.

The motor 102 can be replaced by an engine or the like. The propeller 104 is drivable by a motor and rotates clockwise and/or counterclockwise about the axis of rotation of the motor 102 (e.g., the long axis of the motor).

In the present embodiment, the motor 102 can rotate the propellers 104 all in the same direction, or can rotate independently. Some of the propellers 104 rotate in one direction and other propellers 104 rotate in the other direction. The blades constituting the propeller 104 can all rotate at the same rotation speed, or can rotate at different rotation speeds. The number of rotations can be determined automatically or manually based on the size (e.g., size, weight) and control state (speed, moving direction, etc.) of the moving body.

The propeller 104 rotates upon receiving an output from the motor 102. The rotation of the propeller 104 generates a propulsive force for the manned aircraft 1 to take off from the ground G, move horizontally, and land at the destination. The propeller 104 can rotate rightward, stop, and rotate leftward.

According to the propeller 104 of the present disclosure, the blade has an elongated shape. Any number of blades (rotors) (e.g, 1, 2, 3, 4, or more blades) may be used. Further, the blade may have any shape such as a flat shape, a bent shape, a twisted shape, a tapered shape, or a combination thereof.

The shape of the blade can be changed (for example, expansion, contraction, folding, bending, etc.). The blades may be symmetric (having identical upper and lower surfaces) or asymmetric (having different shaped upper and lower surfaces).

The blades can be formed to have a geometrical form preferable for generating dynamic aerodynamic forces (e.g., lift, thrust) as an airfoil, wing or blade is moved through the air. The geometrical form of the blade can be selected as appropriate to optimize the dynamic air characteristics of the blade, such as increasing lift and thrust and reducing drag.

The airframe part 20 extends rearward from the center of the front blade part 100 and is connected to the center of the rear blade part 100.

The airframe part 20 according to the present embodiment can be formed of a material appropriately selected from carbon, stainless steel, aluminum, magnesium, or the like, or an alloy or a combination thereof.

The motor 102 and the propeller 104 (hereinafter, referred to as "motor unit") according to the present embodiment are fixed to the airframe part 20. As shown in FIG. 1, the blade part 100 and the airframe part 20 form a predetermined angle θf. θf is in a range of $45° \leq \theta f \leq 90°$, and preferably, $50° \leq \theta f \leq 70°$. θf is configured such that the thrust generated by the thrust generating part has a horizontal component during horizontal movement (see FIG. 3).

As shown in FIG. 1, the ground Gr and the airframe part 20 form a predetermined angle θg. θg is in the range of $0° < \theta g < 45°$, and preferably, $10° \leq \theta g \leq 30°$. θg is configured such that the thrust generated by the thrust generating part has a horizontal component during horizontal movement (see FIG. 3).

Although the motor unit according to the present embodiment is fixed to the airframe part 20, it may be variable under predetermined conditions. That is, in FIG. 1, θf may be made variable in the above-described range ($45° \leq \theta f < 90°$, preferably, $50° \leq \theta f \leq 70°$.

The airframe part 20 has a substantially annular receiving part 31 including the boarding part 30. The receiving part 31 is provided near the approximate center of the airframe part 20.

The boarding part 30 has a substantially annular shape corresponding to the shape of the receiving part 31, and is located inside the receiving part 31. The boarding part 30 and the receiving part 31 are configured to be independently displaceable in a substantially annular circumferential direction.

In the present embodiment, the center of gravity G of the boarding part 30 coincides with a virtual (rotational) axis passing through the center of gravity of the flight part and the airframe part. With this configuration, the boarding part 30 is maintained so as to face in a predetermined direction (so that the occupant (not shown) faces the vertical direction) regardless of the orientation of the airframe part 20.

<Flight Configuration>

Next, with reference to FIG. 1 to FIG. 3, the configuration and transformation at the time of flight will be described.

The propeller 104 according to the present embodiment is provided before the front edge of the blade part 100. In the landing state shown in FIG. 1, the front edge of the blade part 100 is directed upward, and the motor unit is oriented so as to generate at least upward propulsive force. The leg part 202 and the rear blade part (and the motor 102) function as parts that support the manned aircraft 1 during landing.

As shown in FIGS. 2 and 4, at the time of vertical takeoff, the front edge of the blade part 100 is directed upward, and the motor unit generates at least a propulsive force in the upward direction and rises vertically.

As shown in FIGS. 2 and 3, when moving from vertical takeoff (FIG. 2) to horizontal movement (FIG. 3), the airframe part 20 is displaced from backward to forward tilt in the circumferential direction as indicated by a double-headed arrow in the drawing. At this time, the boarding part 30 remains in the same direction.

As shown in FIGS. 3 and 5, during horizontal movement, the airframe part 20 makes a predetermined angle θh with the horizontal direction. θh is in the range of 0°<θf<45°, preferably 10°≤θf≤30°. θh is configured such that the thrust generated by the thrust generating part has a horizontal component during horizontal movement (see FIG. 3). That is, as shown in FIG. 5, the leading edge of the blade part is directed forward, while at the same time, the thrust generating part is functioned so as to generate a propulsive force at least in a forward direction, configured as such to enable displacement of the states thereof.

At the time of descending, the front edge of the blade part 100 is turned upward again, and the motor unit starts descending while reducing at least the upward propulsive force.

In the present embodiment, a lock mechanism is provided for fixing the orientation (θf) of the boarding part to the airframe part 20 during landing and ascending, as shown in FIG. 1. In addition, a lock mechanism is provided for fixing the orientation (θh) of the boarding part to the airframe Part 20 during horizontal movement, as shown in FIG. 3

<Conceptual Explanation>

The concept of the present disclosure will be described with reference to FIGS. 6 and 7. The present disclosure can be conceived as three elements of the flight part 10, the airframe part 20, and the boarding part 30. The flight part 10 is the part that obtains a propulsion force necessary for ascending and flying of the blade part and the motor, etc. The airframe part 20 is the part that connects the flight unit 10 and the boarding part 30. The boarding part 30 is mainly for a person, but may be used for carrying articles such as luggage and other goods. In this case, the manned aircraft 1 is externally controlled or automatically flight controlled for unmanned operation.

As shown in FIG. 7, the boarding part 30 is configured to be displaceable with the airframe part 20 at least in the range of θg and θh. When the horizontal direction is 0°, the airframe part 20 can be displaced in the circumferential direction of the boarding part 30 within a range of less than ±90°.

<General Structure>

The above-mentioned aircraft may have a configuration as shown in FIG. 8, for example.

A flight controller may have one or more processors, such as a programmable processor (e.g., a central processing unit (CPU)).

The flight controller has a memory (not shown) and the memory is accessible. The memory stores logic, codes, and/or program instructions that can be executed by the flight controller to perform one or more steps.

The memory may include, for example, a separable medium or an external storage device such as an SD card or random access memory (RAM). Data obtained from cameras, sensors, or the like may be transmitted directly to the memory and stored. For example, still image•dynamic image data taken by a camera or the like is recorded in the built-in memory or external memory.

The flight controller includes a control module configured to control the state of the aircraft. For example, the control module may control a propulsion mechanism (motor and the like) in order to adjust the spatial arrangement, velocity, and/or acceleration of the aircraft having six degrees of freedom (translational motions x, y, and z, and rotational motions θx, θy, and θz). The control module can control one or more of the states of the mounting part and sensors.

The flight controller can communicate with a transreceiving part configured to send and/or receive data from one or more external devices (e.g., a terminal, a display device, or another remote controller). The transreceiver can use any suitable communication means such as wired or wireless communication.

For example, the transceiving part can use one or more of a local area network (LAN), a wide area network (WAN), infrared, wireless, WiFi, point-to-point (P2P) network, telecommunication network, cloud communication, and the like.

The transreceiving part can transmit and/or receive one or more of the following: data acquired by sensors, process results generated by the flight controller, predetermined control data, user commands from a terminal or a remote controller, and the like.

Sensors according to the present embodiment may include inertial sensors (acceleration sensors, gyro sensors), GPS sensors, proximity sensors (e.g., LiDAR), or vision/image sensors (e.g., cameras).

The following are examples of problems that the present disclosure has in mind.

Weight reduction

High landing reliability

Countermeasures against the shifting of the center of gravity from front to back caused by occupants (in case of VTOLs, the shifts are particularly long in front and back.)

Novelty of appearance

Ease to fly

Better response to strong winds during landing

Productivity

Expandability (from small to large aircraft, and shape of flight part)

The configuration of the present disclosure may have the following features.

Separation and displacement of the flight part and cabin (boarding part)

Fixing the cabin during flight (lock)

Tilting a cabin backward in landing mode
Setting the cabin in a fixed position slightly before the center of gravity of the flight part
Height difference between front propeller and rear propeller at landing
Battery in cabin (boarding and battery replacement can be done at the same time)
Provide a battery in the flight part (this can reduce the cabin and the projected area)
Emergency landing is possible even if the cabin operating mechanism is broken
The connection part is in the range of the boarding part viewed from the side
Connection part is near the center of gravity
The axis of the flight part moves
Mounting axis moves
Hanging cabin
Door access from the side
Low cabin steps

REFERENCE NUMERALS 1 manned aircraft
10 flight part
100 blade part
102 motor
104 propeller
20 airframe part
202 leg part
30 boarding part
302 sheet

The invention claimed is:

1. A manned aircraft comprising:
   a flight part provided with a blade part and a thrust generating part provided on the blade part;
   an airframe part supporting the flight part; and
   a boarding part that is displaceable independently from the airframe part, wherein the blade part includes a front blade part and a rear blade part, which are respectively connected to a front end and a rear end of the airframe part in a first horizontal direction, the front and the rear blade parts each having a wing shape that extends in a second horizontal direction, the second horizontal direction being substantially perpendicular to the first horizontal direction,
   wherein the thrust generating part includes a first plurality of propellers and a second plurality of propellers, the first plurality of propellers being provided on the front blade part, the second plurality of propellers being provided on the rear blade part, each propeller being an unducted propeller,
   wherein a center of gravity of the boarding part substantially coincides with a center of the airframe part,
   wherein the front blade part and the rear blade part are mounted on the airframe part in symmetrical positions around the boarding part, and a first part of the airframe part that connects to the front blade part, the center of gravity of the boarding part, and a second part of the airframe part that connects to the rear blade part are arranged to be in a straight line,
   wherein a fixed angle formed between the airframe part and the front blade part on a leading edge side of the boarding part is an obtuse angle, and a fixed angle formed between the airframe part and the rear blade part on a trailing edge side of the boarding part opposite the leading edge side is an acute angle,
   wherein the airframe part includes a substantially annular receiving part, the boarding part being disposed inside the annular receiving part, and
   the boarding part has a substantially annular shape corresponding to a shape of the annular receiving part, and is configured to be independently displaceable in a substantially annular circumferential direction.

2. The manned aircraft according to claim 1, wherein the boarding part is maintained so as to face in a predetermined orientation regardless of an orientation of the airframe part.

3. The manned aircraft according to claim 2, wherein the thrust generating part is provided in front of a leading edge of the blade part, and
   the flight part is configured as such to enable displacement between a first state and a second state, so that in the first state, including ascent, the leading edge of the blade part is directed upward and the thrust generating part generates at least an upward propulsive force at least in the upward direction, and in the second state, including leveled flight, the leading edge of the blade part is directed forward and the thrust generating part generates at least a forward propulsive force.

4. The manned aircraft according to claim 3, wherein the boarding part is provided substantially near the center of the airframe part.

5. The manned aircraft according to claim 2,
   wherein the center of gravity of the boarding part substantially coincides with a center of gravity of the flight part and the airframe part.

6. The manned aircraft according to claim 3,
   wherein the center of gravity of the boarding part substantially coincides with a center of gravity of the flight part and the airframe part.

7. The manned aircraft according to claim 4, wherein the center of gravity of the boarding part substantially coincides with a center of gravity of the flight part and the airframe part.

8. The manned aircraft according to claim 1, wherein the center of gravity of the boarding part substantially coincides with a center of gravity of the flight part and the airframe part.

9. The manned aircraft according to claim 1, wherein when the manned aircraft lands, the front blade part is higher than the rear blade part in a vertical direction, and during forward flight, the front blade part is lower than the rear blade part in the vertical direction.

* * * * *